(12) United States Patent
Chuang

(10) Patent No.: US 8,218,104 B2
(45) Date of Patent: Jul. 10, 2012

(54) ELECTRONIC DEVICE, LIQUID CRYSTAL DISPLAY MODULE, BACKLIGHT UNIT, AND FRONT FRAME THEREOF

(75) Inventor: Meng-Ju Chuang, Hsinchu (TW)

(73) Assignee: Chimei Innolux Corporation (TW)

( * ) Notice: Subject to any disclaimer, the term of this patent is extended or adjusted under 35 U.S.C. 154(b) by 232 days.

(21) Appl. No.: 12/700,458

(22) Filed: Feb. 4, 2010

(65) Prior Publication Data
US 2010/0195017 A1    Aug. 5, 2010

(30) Foreign Application Priority Data
Feb. 5, 2009 (TW) ................................ 98103625 A

(51) Int. Cl.
*G02F 1/1333* (2006.01)
(52) U.S. Cl. ........................ 349/58; 349/150; 362/630
(58) Field of Classification Search ............... 362/630; 349/150
See application file for complete search history.

(56) References Cited

U.S. PATENT DOCUMENTS
7,760,287 B2 *  7/2010  Oohira ........................ 349/58
* cited by examiner

*Primary Examiner* — Richard Kim
(74) *Attorney, Agent, or Firm* — Lowe Hauptman Ham & Berner, LLP

(57) ABSTRACT

The invention provides an electronic device including a liquid crystal display module and a control circuit. The liquid display module includes a backlight unit and a liquid display panel. The backlight unit has a front frame which includes a plastic frame and a conductive line. The conductive line extends from the rear surface to the rear surface to the front surface of the plastic frame so as to form a contact on the front surface.

7 Claims, 9 Drawing Sheets

ELECTRONIC DEVICE, LIQUID CRYSTAL DISPLAY MODULE, BACKLIGHT UNIT, AND FRONT FRAME THEREOF

This Application claims priorities of Taiwan Patent Application No. 98103625, filed on Feb. 5, 2009, the entirety of which is incorporated by reference herein.

BACKGROUND OF THE INVENTION

1. Field of the Invention

The invention relates to an electronic device, a liquid crystal display module, a backlight unit and a front frame thereof. In particular, the invention relates to the electronic device, the liquid crystal display module, the backlight unit and the front frame thereof with improved assembly precision and reduced costs.

2. Description of the Related Art

Referring to FIG. 1A, FIG. 1A is an exploded view from the front angle of a conventional liquid crystal display module 10. As shown in FIG. 1A, the conventional liquid crystal display module 10 comprises a front cover 12, a panel 14 and a backlight unit 16, wherein the panel 14 and the backlight unit 16 respectively comprise flexible circuit boards 147, 167.

Referring to FIG. 1B, FIG. 1B is a schematic view from the back angle of the liquid crystal display module 10 in FIG. 1A. As shown in FIG. 1B, in the assembled backlight unit 16, the flexible circuit board 167 of the backlight unit 16 is electrically connected to the flexible circuit board 147 of the panel 14. Additionally, the liquid crystal display module 10 electrically connects with an external control circuit (not shown) through the flexible circuit board 147.

Referring to FIG. 2A and FIG. 2B simultaneously, FIG. 2A is an exploded view from the front angle of the conventional backlight unit 16, and FIG. 2B is an exploded view from the back angle of the backlight unit 16 in FIG. 2A. As shown in FIG. 2A and FIG. 2B, the backlight unit 16 is assembled by stacking an upper cover 161, a front frame 162, a plurality of optical films 163, a light guide plate 164, a reflective plate 165 and a back frame 166 in sequence. Usually, the front frame 162 is a plastic frame and the back frame 166 is an iron frame.

The backlight unit 16 utilizes a point light source 168 to provide a light beam. The point light source 168 is a light emitting diode disposed on the flexible circuit board 167. Referring to FIG. 3 simultaneously with FIG. 2A and FIG. 2B, FIG. 3 is a plan view of the flexible circuit board 167 in FIG. 2B. As shown in FIG. 3, the point light source 168 is disposed on an end of the flexible circuit board 167, and the contacts 1674 are disposed on the other end of the flexible circuit board 167. Electricity is inputted from the contacts 1674, and through a conductive line 1672, to the point light source 168.

During operation, the point light source 168 generates a light beam. The light beam is guided by the light guide plate 164 to change directions, be uniformed by the optical films 163, and then be emitted out of the backlight unit 16. The reflective plate 165 reflects light beams which leak out from under the light guide plate 164 back toward the light guide plate 164, for energy efficiency.

However, during the assembly of the conventional backlight unit 16, the flexible circuit board 167 might be stretched so that the point light source 168 is shifted, causing non-uniform illumination of the backlight unit 16.

BRIEF SUMMARY OF THE INVENTION

Accordingly, the invention provides an electronic device, liquid crystal display module, a backlight unit, and a front frame thereof. A flexible circuit board of the backlight unit can be eliminated to solve the problem of the conventional technique and further reduce manufacturing costs.

The backlight unit of the invention comprises a plastic frame and a conductive line, wherein the conductive line extends from a rear surface to a front surface of the plastic frame so as to form a contact on the front surface.

In a preferred embodiment, the plastic frame having a recess, extended from the rear surface, through a side surface, to the front surface, and the conductive line is formed in the recess.

The backlight unit of the invention comprises the front frame, a point light source and a light guide plate, wherein the light guide plate is disposed on the rear surface of the plastic frame and coupled to the conductive line. The light guide plate guides light generated by the point light source to emit outward.

In a preferred embodiment, the backlight unit further comprises a back frame assembled with the front frame and covering the light guide plate.

In a preferred embodiment, the backlight unit further comprises a reflective plate disposed between the light guide plate and the back frame.

In a preferred embodiment, the backlight unit further comprises an optical film disposed in front of the light guide plate.

The liquid crystal display module of the invention comprises the backlight unit and a liquid crystal panel, wherein the liquid crystal panel comprises a flexible circuit board coupled to the contact.

The electronic device of the invention comprises the liquid crystal display module and a control circuit, wherein the control circuit controls an image displayed by the liquid crystal module.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
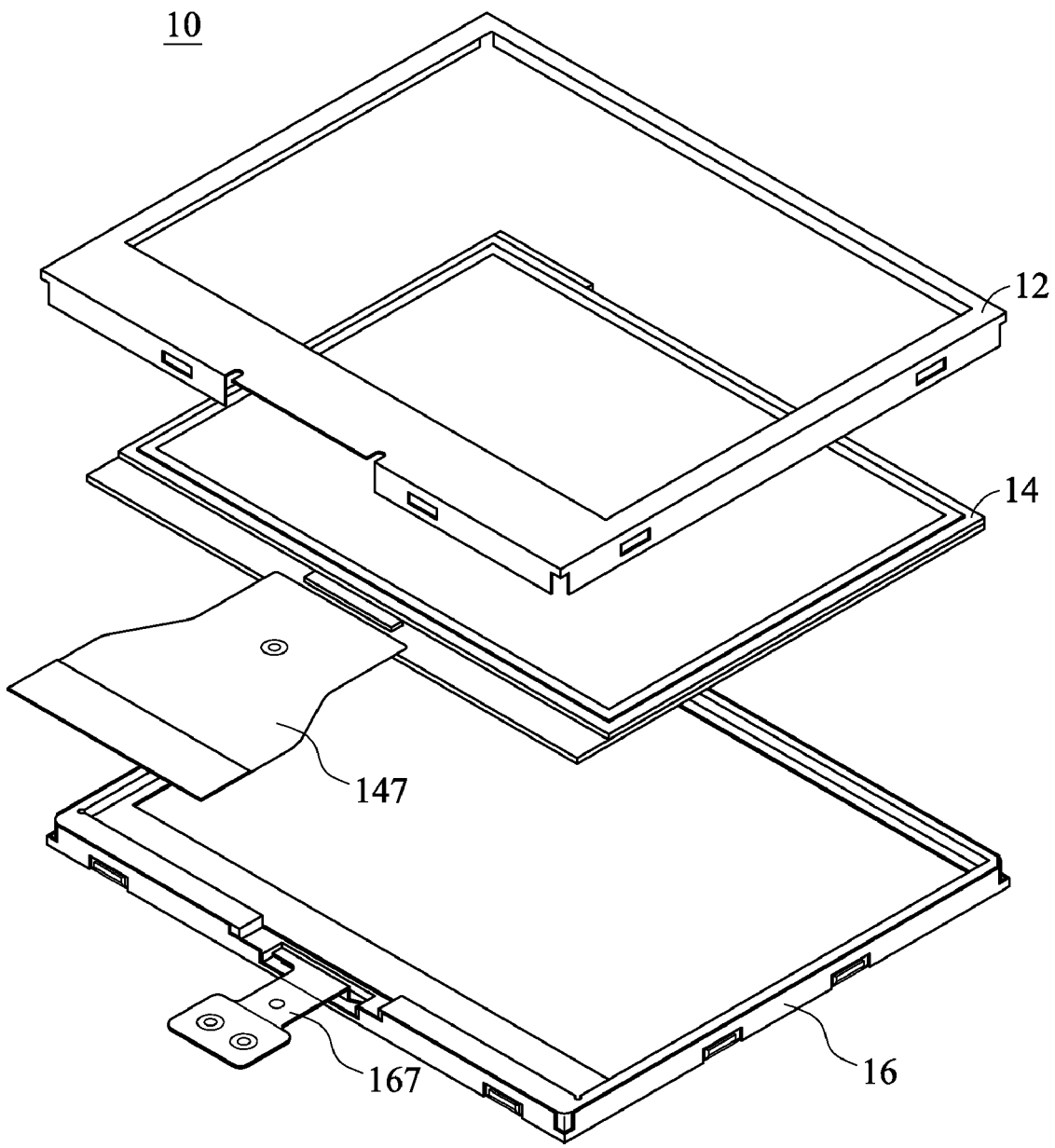
FIG. 1A is an exploded view from the front angle of a conventional liquid crystal display module.
Figure 1B:
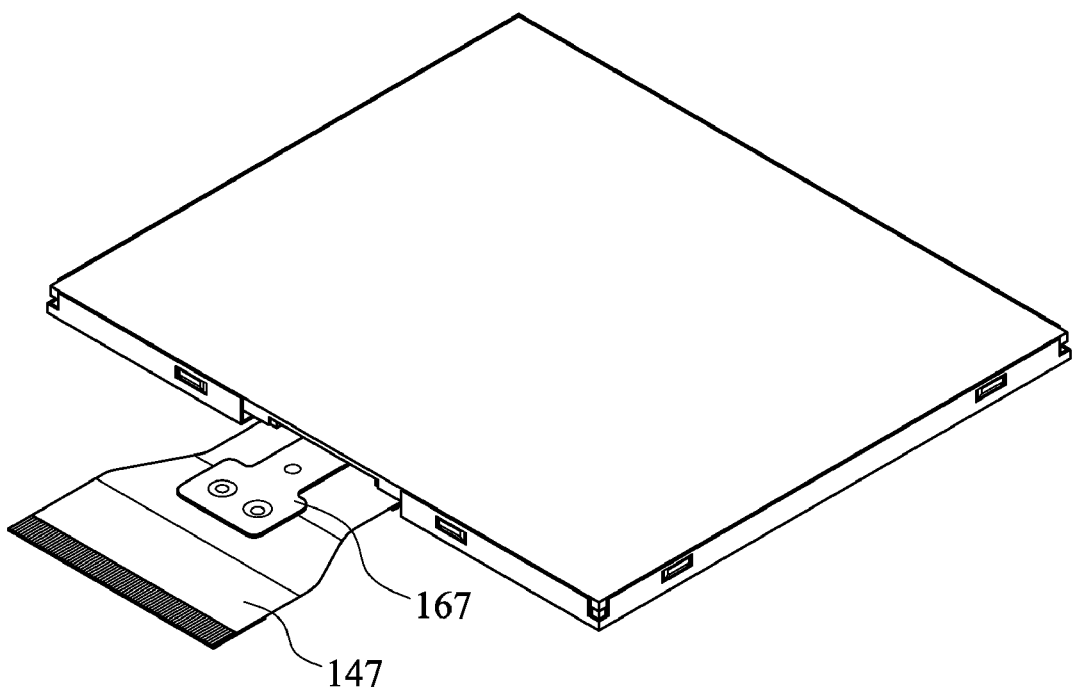
FIG. 1B is a schematic view from the back angle of the liquid crystal display module in FIG. 1A.
Figure 2A:
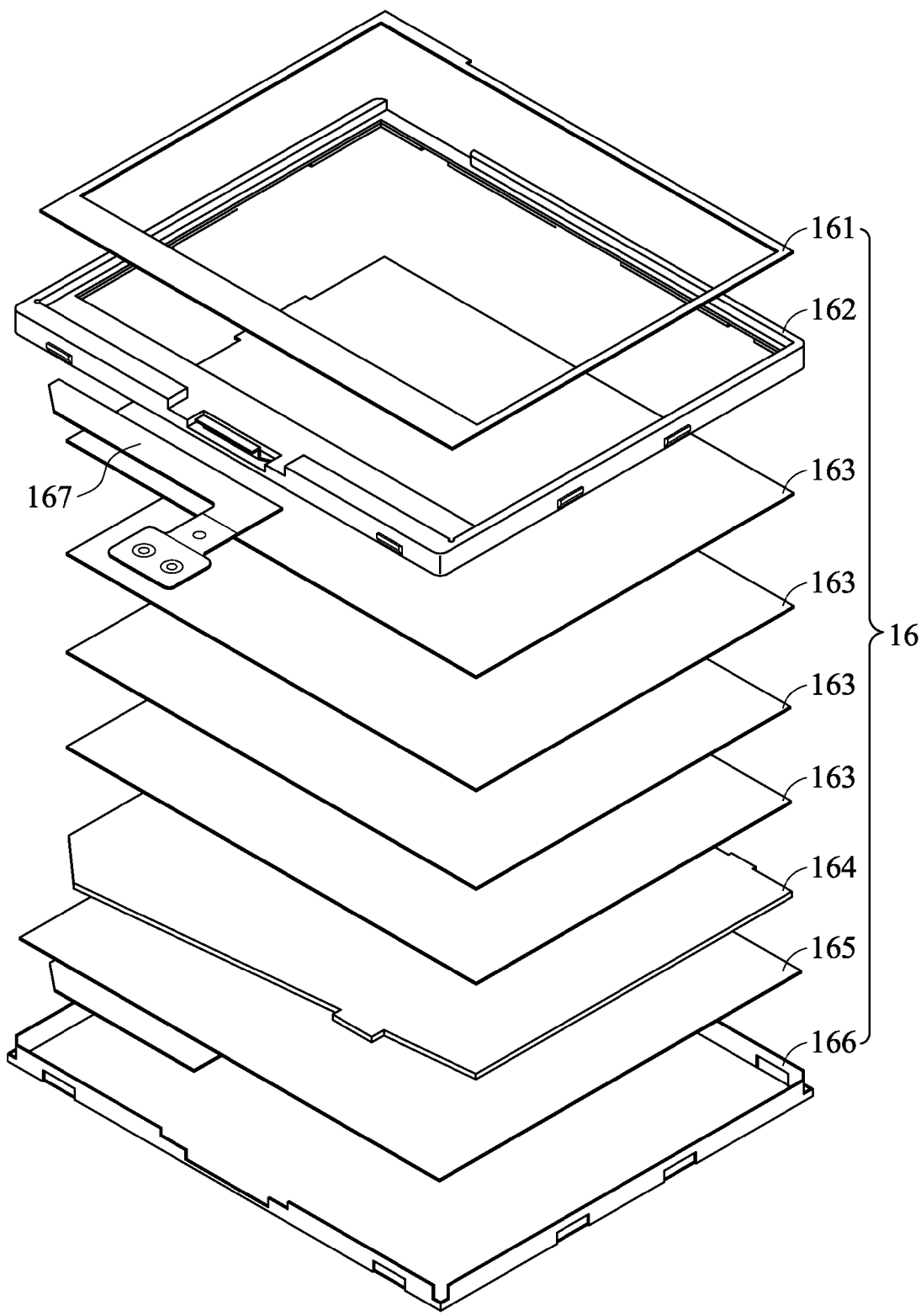
FIG. 2A is an exploded view from the front angle of a conventional backlight unit.
Figure 2B:
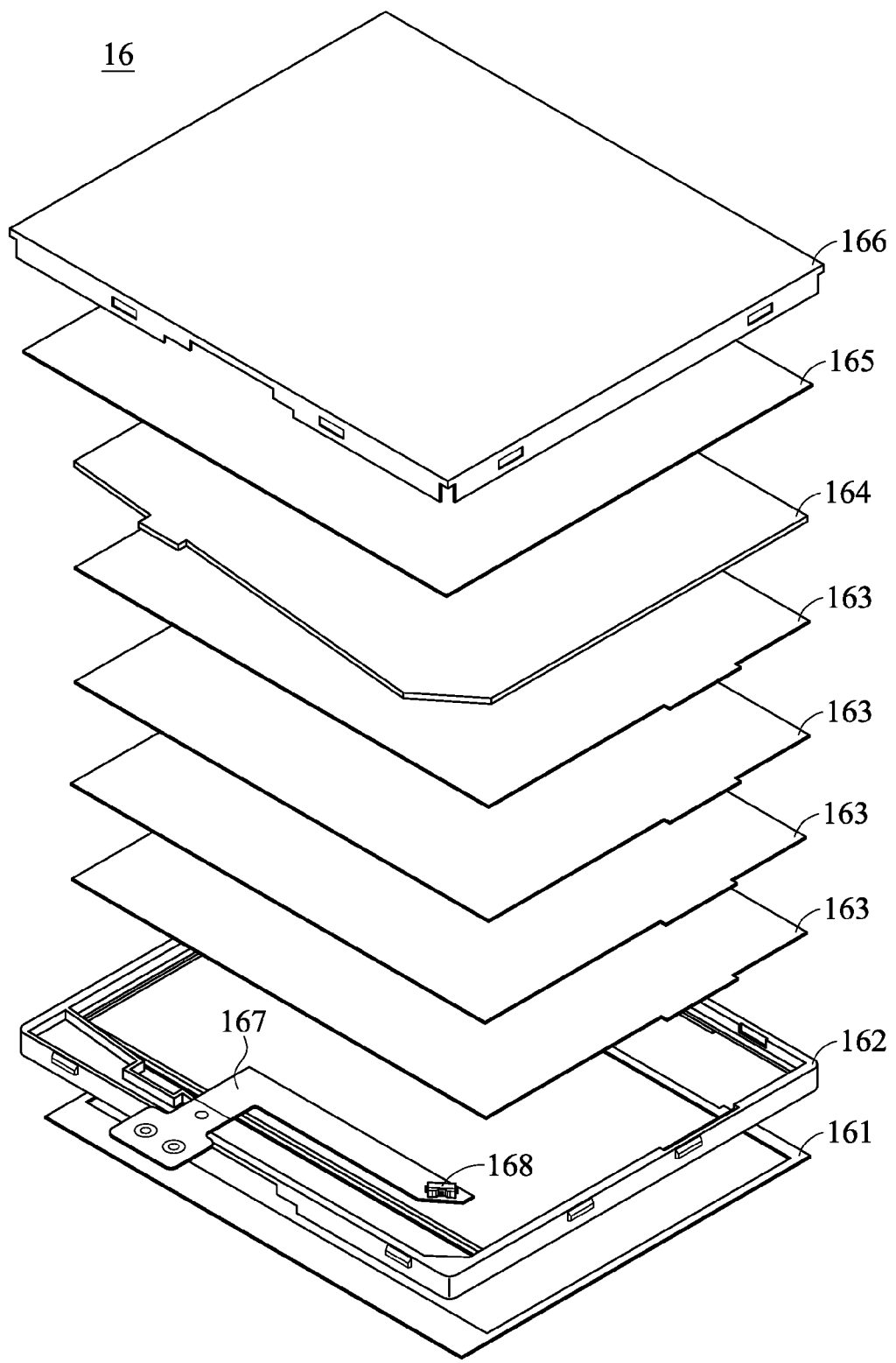
FIG. 2B is an exploded view from the back angle of the backlight unit in FIG. 2A.
Figure 3:
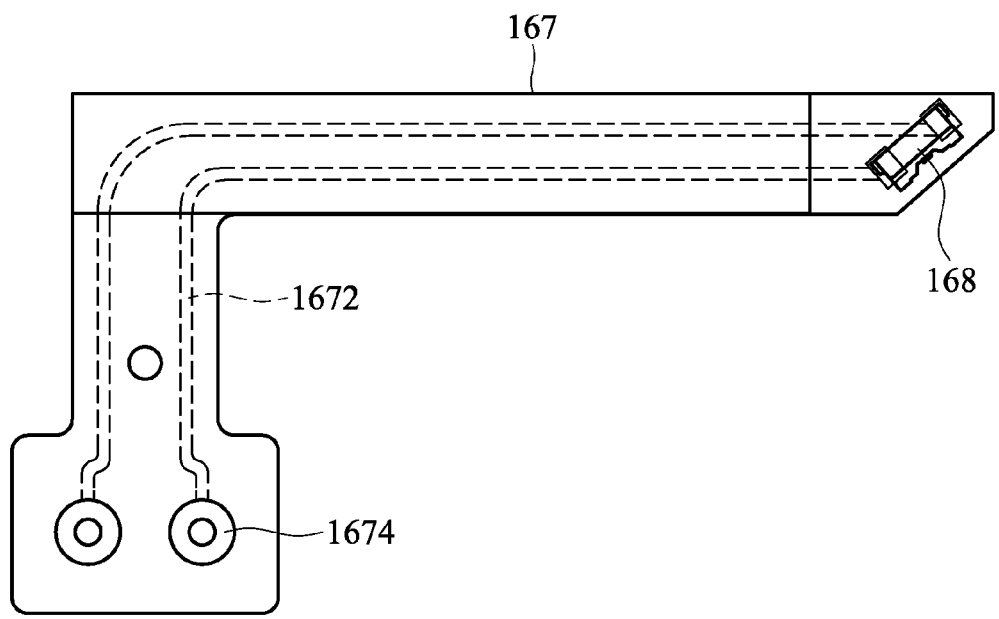
FIG. 3 is a plan view of a flexible circuit board in FIG. 2B.
Figure 4:
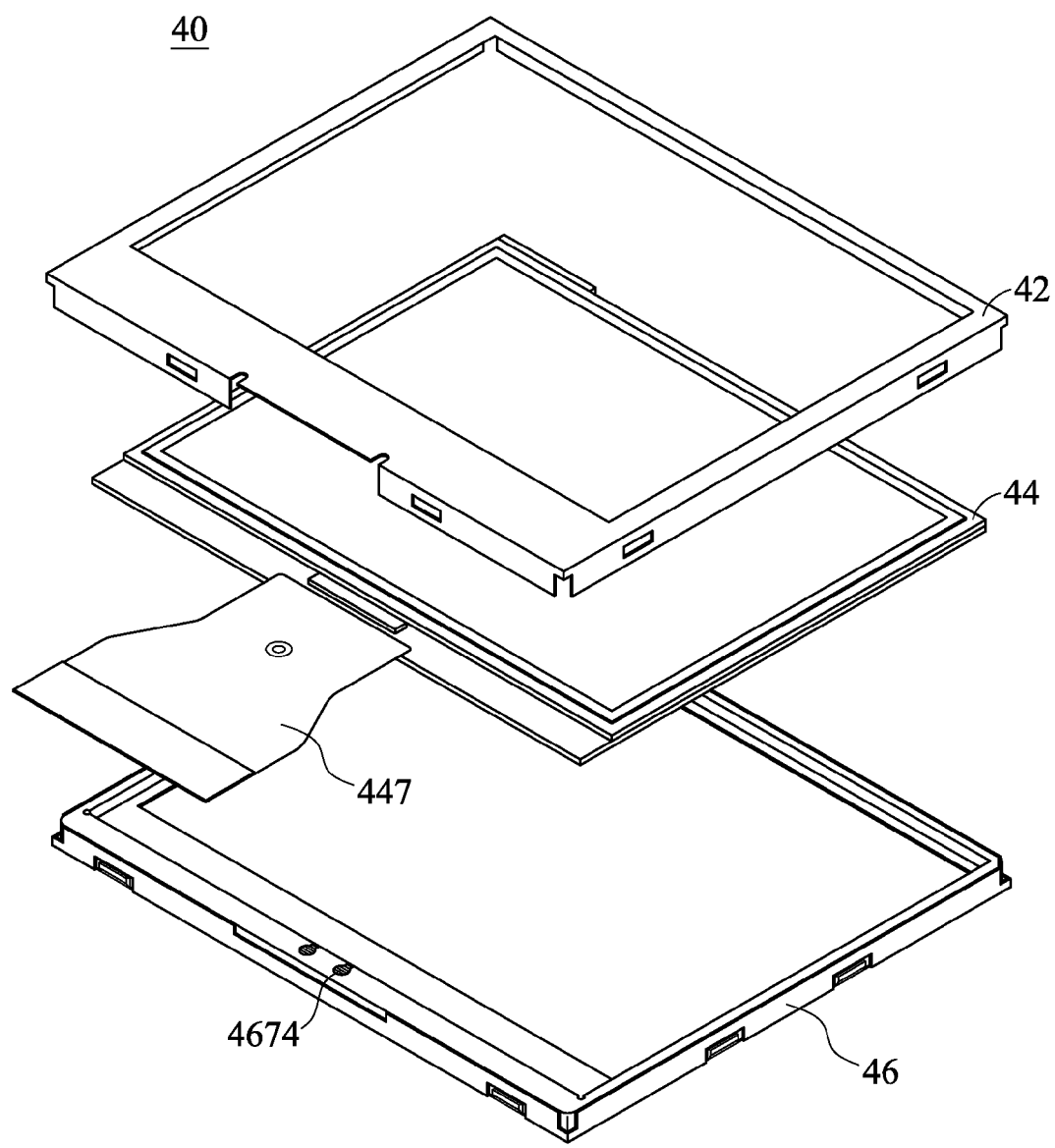
FIG. 4 is an exploded view from the front angle of an embodiment of the liquid crystal display module.

Referring to FIG. 4, FIG. 4 is an exploded view from the front angle of an embodiment of the liquid crystal display module 40. As shown in FIG. 4, the liquid crystal display module 40 comprises a front cover 42, a panel 44 and a backlight unit 46, wherein the panel 44 has a flexible circuit board 447, and the backlight unit 46 does not have a flexible circuit board. After assembly, the flexible circuit board 447 of the panel 44 electrically connects to a contact 4674 of the backlight unit 46. Additionally, the liquid crystal display module 40 electrically connects with an external control circuit (not shown) through the flexible circuit board 447.

Figure 5:
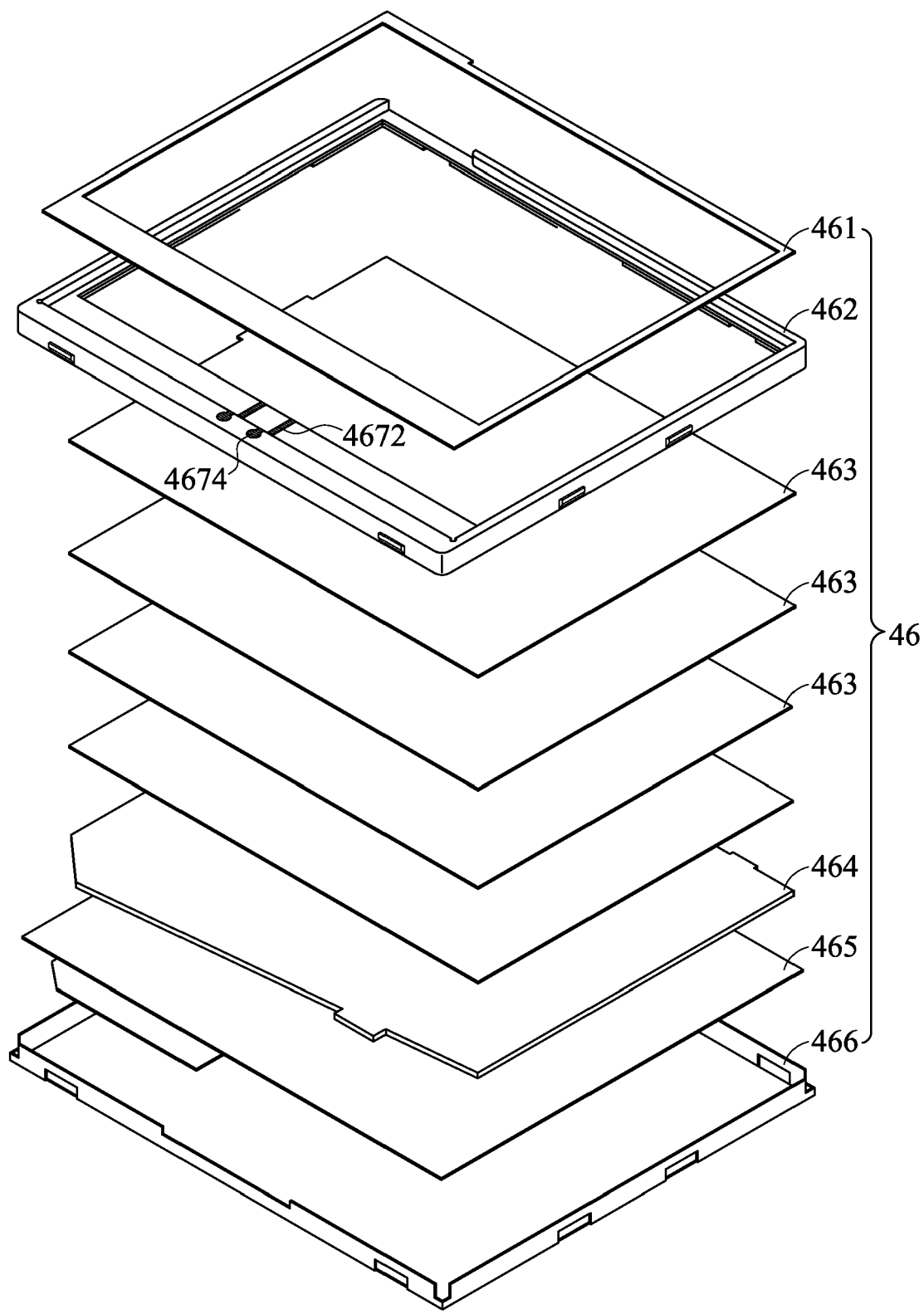
FIG. 5 is an exploded view from the front angle of a backlight unit of the liquid crystal display module.

Referring to FIG. 5, FIG. 5 is an exploded view from the front angle of a backlight unit of the liquid crystal display module 46. As shown in FIG. 5, the backlight 46 is assembled by stacking an upper cover 461, a front frame 462, a plurality of optical films 463, a light guide plate 464, a reflective plate 465 and a back frame 466 in sequence. The front frame 462 is a plastic frame, and the back frame 466 is an iron frame or a metal frame.

Figure 6A:
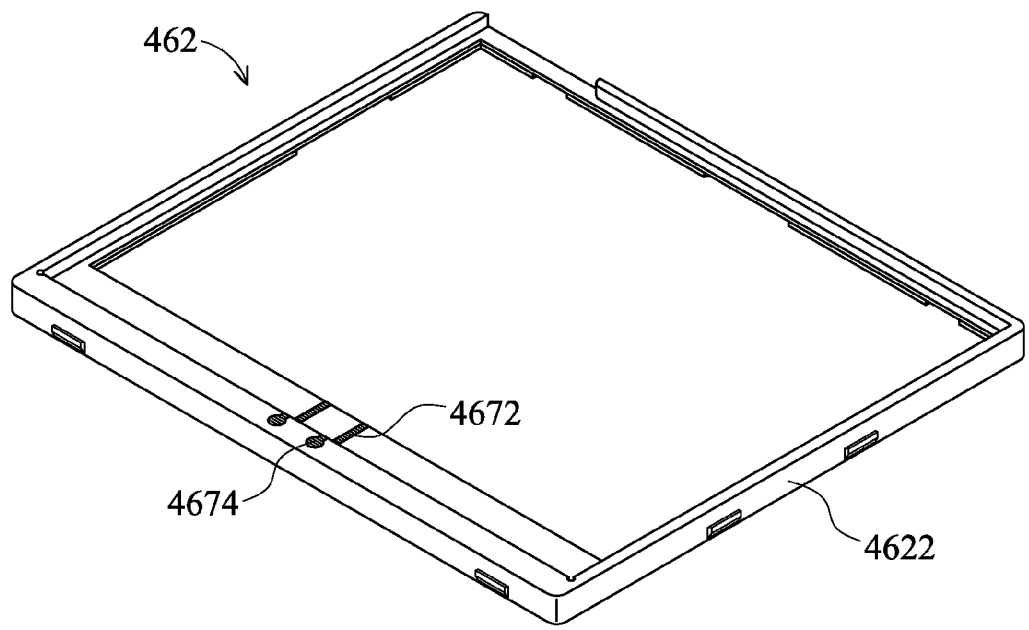
FIG. 6A is a schematic view from the front angle of a front frame the backlight unit in FIG. 5.
Figure 6B:
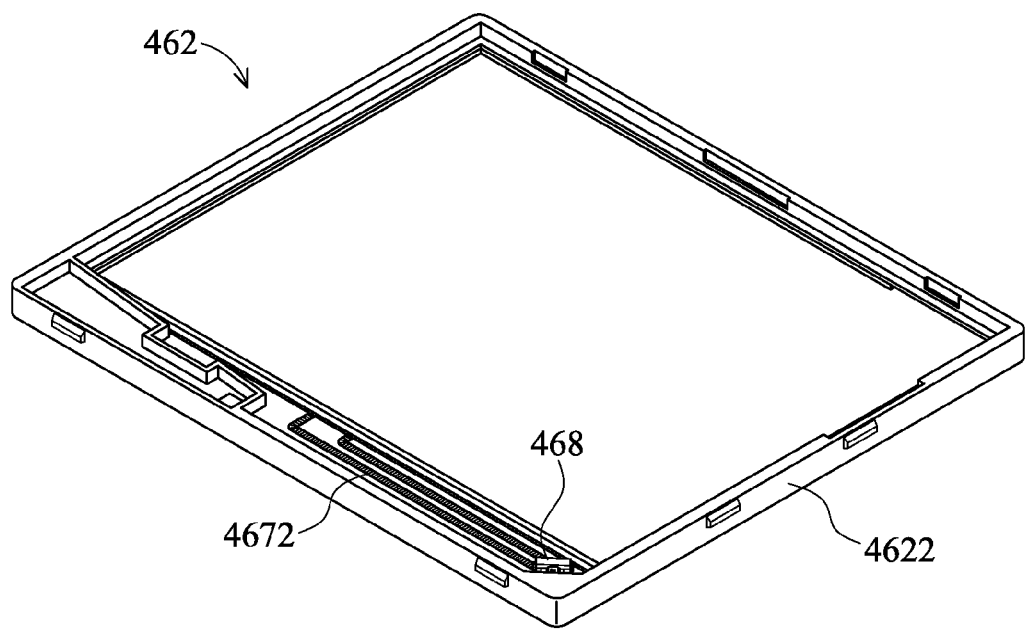
FIG. 6B is a schematic view from the back angle of the front frame of the backlight unit in FIG. 5.

Referring to FIG. 6A and FIG. 6B simultaneously, FIG. 6A is a schematic view of the front frame 462, and FIG. 6B is a schematic view of the front frame 462. As shown in FIG. 6A and FIG. 6B, a point light source 468 is disposed on a rear surface of the front frame 462. The point light source 468, a light emitting diode, generates a light beam. The light beam is guided by the light guide plate 464 to change directions, is uniformed by the optical films 463, and then emitted out of the backlight unit 46.

A recess is disposed on the front frame 462, and the recess extends from the rear surface, through a side surface, to a front surface of the front frame 462. A conductive line 4672 is formed in the recess. As shown in FIG. 6A and FIG. 6B, the conductive line 4672 extends from the rear surface to the front surface of the front frame 462. The conductive line 4672 electrically connects the point light source 468 onto the rear surface, and forms a contact 4674 on the front surface. The electricity is inputted from the contact 4674, through the conductive line 4672, to the point light source 468.

In the embodiment, the conductive line (a conductor) 4672 is disposed on the front frame (a non-conductor) 462 by Molded Interconnect Device (MID) technology to replace a flexible circuit board in the conventional backlight unit, such that non-uniform illumination caused by stretching of the flexible circuit board can be eliminated, and the manufacturing costs of the backlight unit can be decreased.

In the described embodiment, the backlight unit comprises only one point light source. However, it should be noted that when the backlight unit comprises two or more than two point light sources, the MID technology is used to set the conductive line on the front frame to electrically connect with all the point light sources, replacing the conventional flexible circuit board.

Figure 7:
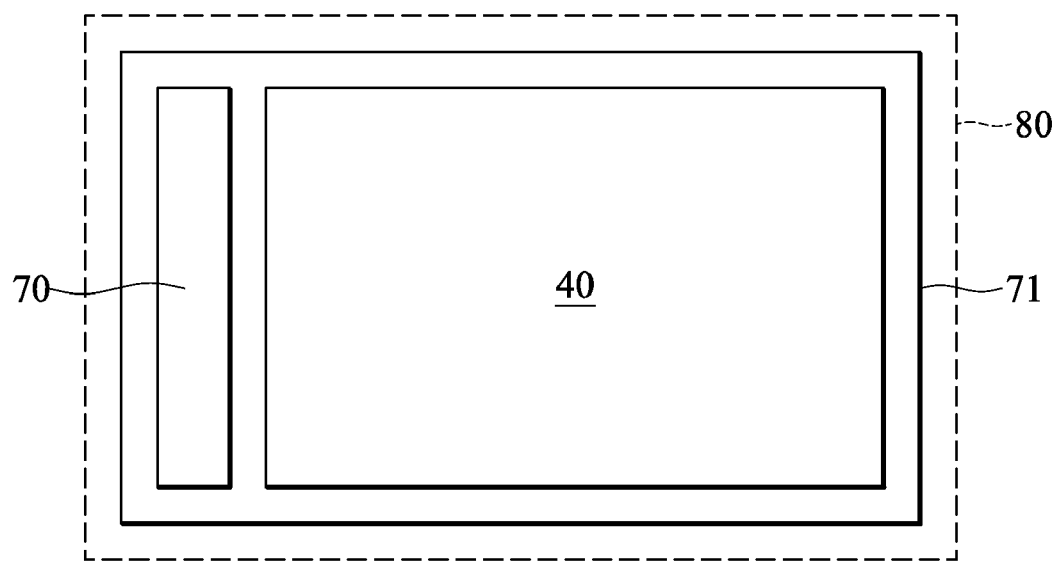
FIG. 7 is a block diagram according to another embodiment of electronic device of the invention comprising the liquid crystal display module in FIG. 4.

FIG. 7 is a block diagram according to another embodiment of electronic device of the invention comprising the liquid crystal display module in FIG. 4. The electronic device 80 comprises the liquid crystal display module 40 in FIG. 4 and a control circuit 70 connected to the liquid crystal display module 40. The control circuit 70 controls an image display b of the liquid crystal display module 40. Moreover, the liquid crystal display module 40 and control circuit 70 are placed in a housing 71. The electronic device 80 is a liquid crystal display television (LCD TV), a liquid crystal surveillance device, a multi-media player, a mobile phone, a digital camera, a personal digital assistance, a portable computer, a desktop computer, a global position system (GPS), a car monitor, an flight display, a digital photo frame, a portable DVD player or other device comprising a display screen.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display module, comprising:
   a backlight unit, comprising:
      a front frame, wherein the front frame comprises:
         a plastic frame; and
            a conductive line extends from a rear surface to a front surface of the plastic frame so as to form a contact on the front surface;
      a point light source disposed on the rear surface and coupled to the conductive line; and
      a light guide plate guiding light generated by the point light source to emit outward; and
   a liquid crystal panel comprising a flexible circuit board coupled to the contact.

2. The liquid crystal display module as claimed in claim 1, wherein the plastic frame having a recess, extended from the rear surface, through a side surface, to the front surface, and the conductive line is formed in the recess.

3. The liquid crystal display module as claimed in claim 1, wherein the backlight unit further comprises a back frame assembled with the front frame and covering the light guide plate.

4. The liquid crystal display module as claimed in claim 3, wherein the backlight unit further comprises a reflective plate disposed between the light guide plate and the back frame.

5. The liquid crystal display module as claimed in claim 1, wherein the backlight unit further comprises an optical film disposed in front of the light guide plate.

6. The liquid crystal display module as claimed in claim 1, further comprising:
   a control circuit, controlling an image displayed by the liquid crystal display module.

7. An electronic device comprising:
   a liquid crystal display module comprising:
      a backlight unit, comprising:
         a front frame, wherein the front frame comprises:
            a plastic frame; and
               a conductive line extends from a rear surface to a front surface of the plastic frame so as to form a contact on the front surface;
         a point light source disposed on the rear surface and coupled to the conductive line: and
         a light guide plate guiding light generated by the point light source to emit outward;
      a liquid crystal panel comprising a flexible circuit board coupled to the contact; and
      a control circuit configured to control an image displayed by the liquid crystal display module; and
   at least one of a liquid crystal display television, a liquid crystal surveillance device, a multi-media player, a mobile phone, a digital camera, a personal digital assistance, a portable computer, a desktop computer, a global position system, a car monitor, an flight display, a digital photo frame, a portable DVD player or a display screen.

* * * * *